Oct. 25, 1927.
G. W. DENISON
1,646,901
MECHANISM FOR PROGRESSING CARS IN KILNS
Filed Oct. 7, 1924   3 Sheets-Sheet 1
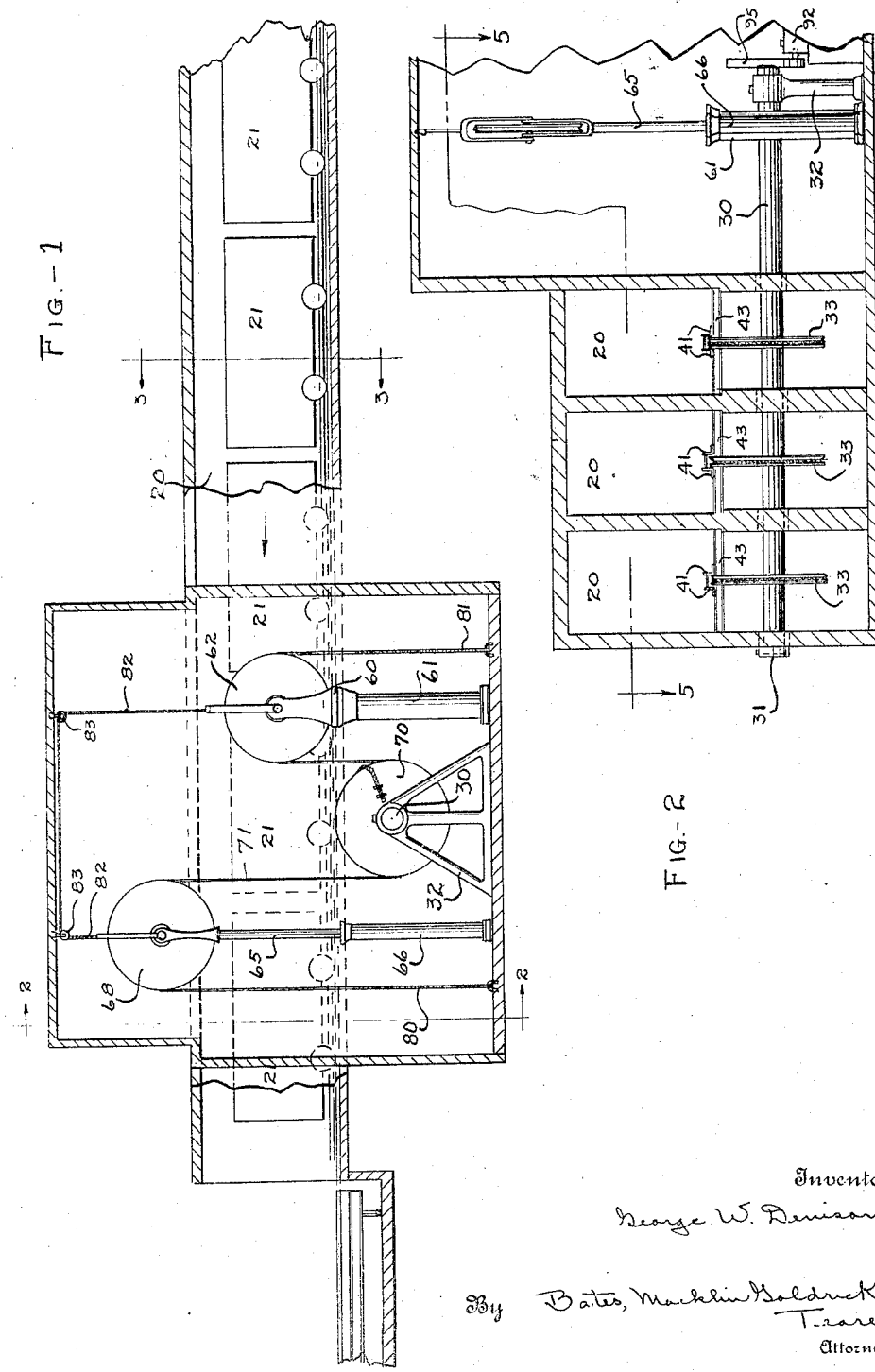

Oct. 25, 1927.

G. W. DENISON 1,646,901

MECHANISM FOR PROGRESSING CARS IN KILNS

Filed Oct. 7, 1924

3 Sheets-Sheet 2

Inventor
George W. Denison

By Bates, Macklin, Goldrick &
Teare
Attorneys

Oct. 25, 1927.

G. W. DENISON 1,646,901

MECHANISM FOR PROGRESSING CARS IN KILNS

Filed Oct. 7, 1924   3 Sheets-Sheet 3

Inventor
George W. Denison

By Bates, Macklin, Goldrick & Teare
Attorneys

Patented Oct. 25, 1927.

1,646,901

UNITED STATES PATENT OFFICE.

GEORGE W. DENISON, OF BAY VILLAGE, OHIO.

MECHANISM FOR PROGRESSING CARS IN KILNS.

Application filed October 7, 1924. Serial No. 742,150.

This invention is concerned with drying and burning kilns for ceramic ware, and the general object thereof is the provision of an efficient mechanism requiring a minimum of power for progressively moving long trains of lightly constructed, loaded trucks through a kiln of the car tunnel type.

A further object of my invention is the provision of a truck actuating mechanism in association with a car tunnel kiln which will actuate a large number of loaded trucks without exerting either a draw bar pull for the entire trainload on the individual trucks nor a ram pressure through the truck frames, equivalent to the tractive resistance of the train. A further object of my invention is the provision of a truck actuating mechanism adapted to engage each truck whereby the truck train may be expressed through the car tunnel with the trucks in an unconnected and spaced apart relation.

Other objects of my invention will hereinafter be set forth in the following description referring to the accompanying drawings, illustrating a preferred form thereof. The essential characteristics are summarized in the claims.

Figure 3:
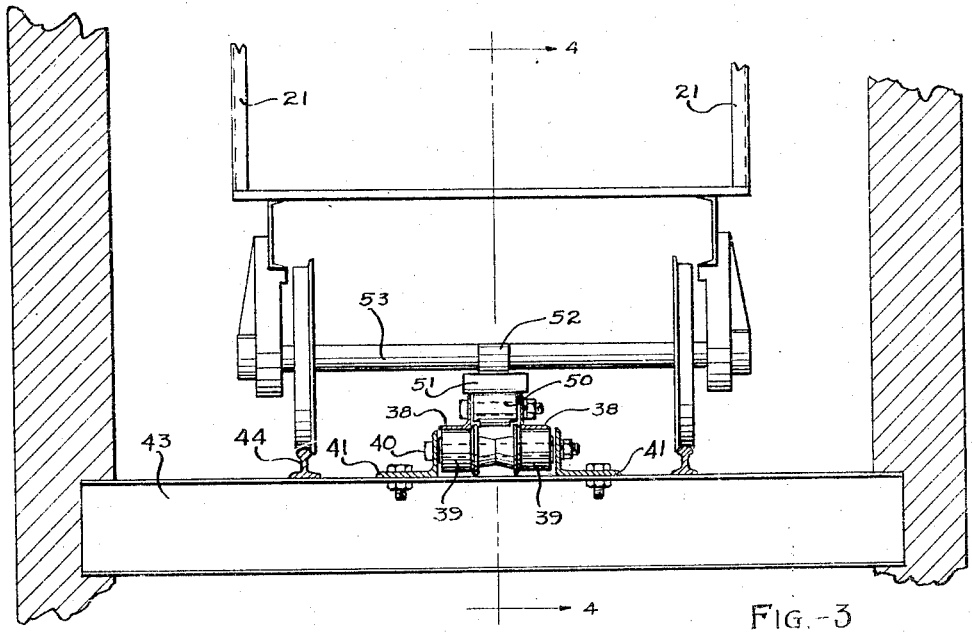
Figure 4:
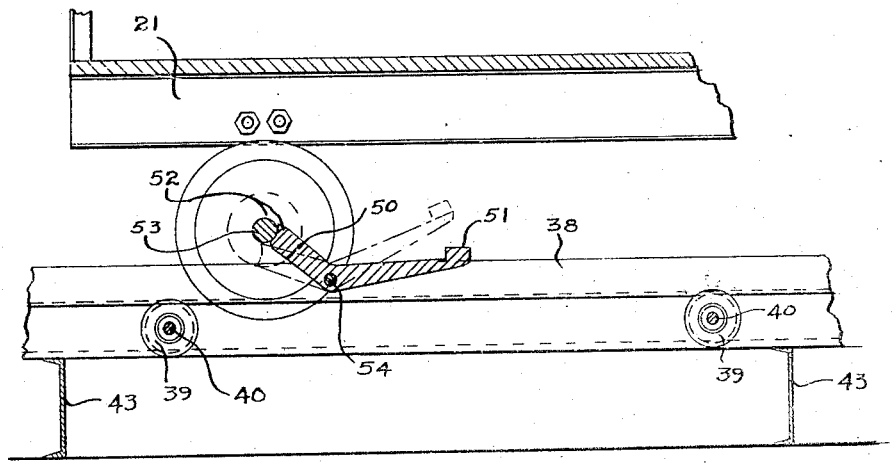
Figure 6:
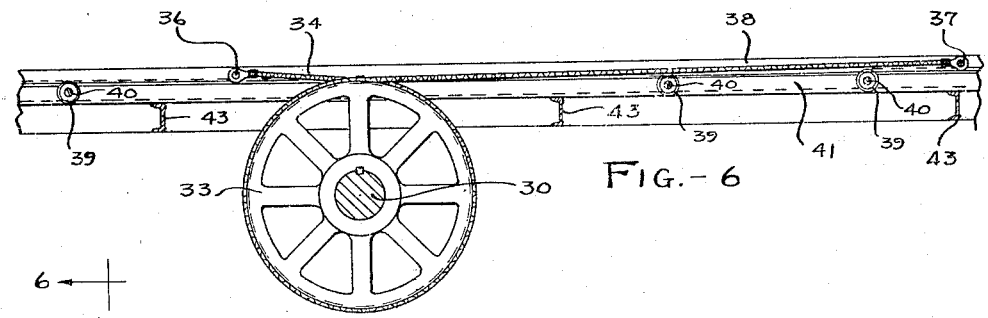
Figure 5:
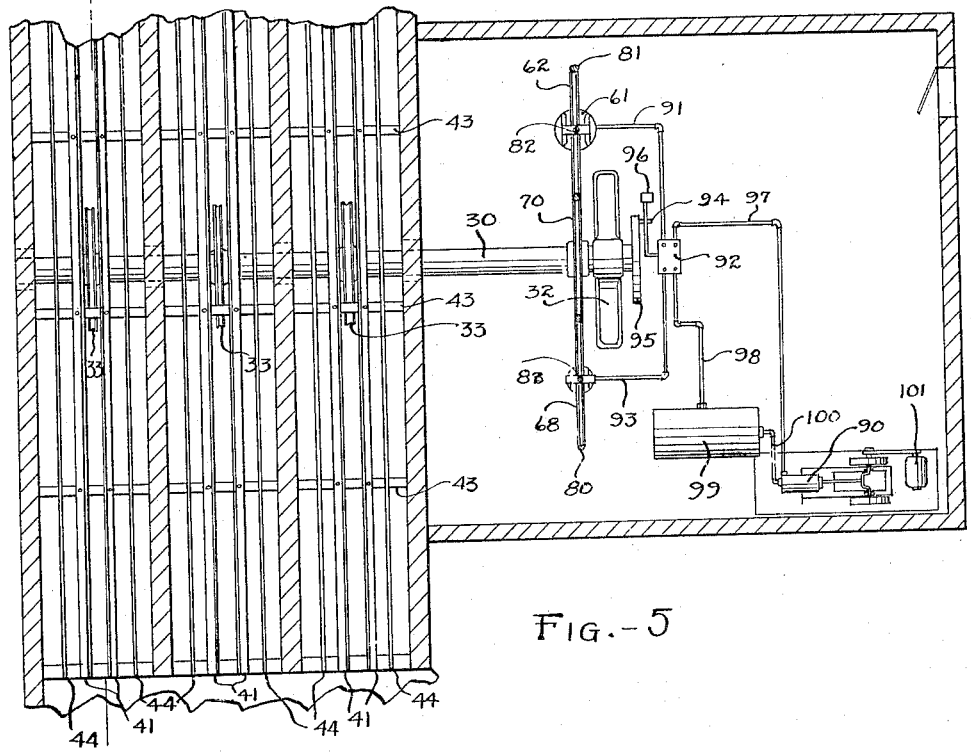

In the drawings, Fig. 1 is a longitudinal cross sectional elevation of one end of a drier car tunnel, equipped with my novel car actuating means; Fig. 2 is a transverse sectional elevation taken substantially along the lines 2—2 of Fig. 1; Fig. 3 is an enlarged fragmentary cross sectional elevation taken substantially along the lines 3—3 of Fig. 1; Fig. 4 is a cross sectional detail on an enlarged scale showing an automatic connecting mechanism between an axle of one of the trucks and the truck actuating mechanism; Fig. 5 is a cross sectional plan view taken through a plurality of car tunnels and showing a convenient disposition of the power means relative to the tunnels; Fig. 6 is a longitudinal cross sectional view through the truck actuating means substantially along the lines 6—6 of Fig. 5.

Recent development of burning kilns for ceramic ware and particularly kilns adaptable for the drying and burning of brick and tile have resulted in the use of kilns of the car tunnel type of unusual length whereby the maximum thermal efficiency may be obtained. The characteristics of such tunnel kilns are set forth in my copending application on a drier kiln, Serial Number 738,837, and filed Sept. 20, 1924. Trafficking conditions presented by the use of such kilns necessitate the use of two types of trucks if the economic possibilities are to be taken advantage of, and accordingly, the burning kiln truck has greater capacity and is of heavier construction than the drier kiln truck which for economic reasons should be of light construction.

My invention therefore contemplates the use of a mechanism in the nature of a draw bar, extending throughout the length of the drier tunnel and which may be hydraulically actuated in a reciprocatory movement, whereupon each drier truck in the train may be individually and automatically engaged by the draw bar mechanism upon each reciprocation of the draw bar. The individual engaging of each truck is a feature which permits the use of trucks of light construction which are of not sufficient strength to withstand either a draw bar pull through the truck train while coupled together nor to withstand the necessary pressure to push or move the cars, which may number fifty or more in one train, by the use of the ordinary hydraulic ram commonly in drier kilns. Thus any straining of the truck structure or the endangering of the successful operation of the kiln by the tendency of the cars to buckle and derail may be eliminated by applying only sufficient force to each car to move it.

In Fig. 1, I show a car tunnel 20, more or less diagrammatically, through which a number of cars 21 are being slowly expressed by the action of a draw bar mechanism shown in detail in Figs. 3, 4 and 6. Fig. 2 shows the actuating means as being adapted to act on three draw bar mechanisms a draw bar mechanism being disposed in each of the parallel tunnels 20. The draw bar proper may comprise angle members 38 extending throughout the length of the tunnel and mounted upon anti-friction rollers 39. The rollers 39 are mounted upon a shaft 40 supported by suitable brackets 41, secured to steel cross ties 43 supporting the track rails 44, the draw bar being located in the tunnel to lie between the track rails. I provide a plurality of spaced apart means on the draw bar for individually connecting the trucks to the draw bar which may act automatically when the draw bar is moving in one direction of its reciprocatory movement. Hence disposed between the draw bar angle members 38 is a plurality of drop levers 50 provided with counter weighted ends 51 whereby forward truck engaging end 52 thereof may be extended upwardly to travel horizontally in line with the axles of the trucks. A suitable stop in the nature of an extension of the counterweights serve to maintain the drop lever in the position shown in cross section in Fig. 4. The counter weighted ends 51 of the drop lever have sufficient width to contact with the top edges of the rails of the draw bar angle members 38 to maintain the lever in axle engaging position to contact with axle 53 of the drier truck 21. The pins 54 on the draw bar and upon which the dog levers are mounted may be of sufficient strength only to move one or two cars and these pivot pins are mounted in spaced relation on the angle members 38 whereby the trucks when being moved are spaced apart a distance corresponding to the length of the trucks 21 plus the desired spacing distance, plus an over travel, whereby, the return stroke of the dog levers will over travel the spaced position of the axle on the next truck. It is to be understood of course that there is a dog lever for each car and that these levers will contact with and pass under the axles to be engaged on the return stroke as shown in the dot and dash position of the lever in Fig. 4. This spaced relation of the dog levers is effective in maintaining the trucks in spaced apart relation in the drier tunnel.

If desired the draw bars may be actuated by hydraulic rams connected directly thereto, but I prefer to utilize an intermediate mechanism between the ram and draw bar whereby a plurality of draw bars may be actuated simultaneously by one ram. Accordingly the draw bar members 38 may be reciprocated by cables 34 Fig. 6 having the ends 36 and 37 thereof attached to the angle members in any suitable manner such as pins extending through the angles. These cables are looped about sheave members 33, one being disposed in each tunnel 20 beneath the trackways. The diameter of the sheaves 33 is such that one revolution thereof will move the draw bars longitudinally of the tunnel a distance corresponding to the length of the drier cars 21, plus the desired space between the car and the desired over travel of the dogs relative to the axles to be engaged. The sheaves 33 are mounted upon a slowly rotating heavy shaft 30 suitably bearing in a block 31 at one end, and on a bracket bearing 32 at the other end and actuated by a hydraulic ram as will now be described.

The shaft 30 may be actuated by any suitable power means but is preferably hydraulically actuated and in Figs. 1, 2 and 5 I show a pair of hydraulic rams suitably housed adjacent the kiln structure. This hydraulic mechanism may comprise a slow moving ram 60 and cylinder 61, and a smaller, faster moving ram 65 and cylinder 66. The upper end of the ram 60 is bifurcated to comprise a support for a sheave 52 which when operated actuates the shaft 30 and draw bars when under full load. The small ram 65 actuates the draw bars in the opposite direction under no load at an increased speed. The ram 65 and cylinder 66 are accordingly made smaller whereby this quick return of the draw bars may be effected. The rams are mechanically connected to the shaft 30 by a flexible member in the form of a cable.

The ram 65 carries a sheave 68 on the upper end thereof and the ram 60 carries a sheave 62 on its upper end. The two rams when operated in opposite directions serve to rotate the shaft 60 by actuating a sheave 70 over which the cable 71 passes; the sheave 70 being mounted on the shaft in alignment with the sheaves 68 and 62. The ends 80 and 81 of the cable 71 are anchored in any suitable manner to the base of the ram cylinders or to the means supporting the cylinders.

Due to the difference in weight of the rams, a cable 82 is provided, extending over small sheaves 83 disposed immediately above the two rams and secured to the structure housing the mechanism, whereby the movements may be synchronized. The ends of the stabilizing cable 82 are attached to the rams whereby the movement therebetween must necessarily be uniform, regardless of the direction of movement of either ram.

To operate the rams, oil is alternately forced into the cylinders 61 and 66 and as shown in Fig. 5, I provide a valve mechanism 92 adjacent the end of the main shaft 30 which is controlled by movement of the shaft, whereby an oil pump 90 may alternately force oil into the cylinders 61 and 66. A pipe line 91 extends from the bottom of the cylinder 61 to the valve mechanism 92, and a similar pipe line 93 extends from the bottom of the cylinder 66 to the valve mechanism 92. Pin members 94, carried by a disc 95 mounted on the end of the shaft 30 swing a counter weighted lever 96 upwardly and over a dead center, whereupon the weight on the lever causes a quick actuation of the valve to transfer the flow of oil being forced through the line 97 from the pump alternately to the cylinders. The nature of the valve mechanism 92 is such that the oil is permitted alternately to escape from the pipe lines 93 and 91 to a pipe line 98 into a reservoir 99 from which the pump draws the oil through a pipe line 100. I find that with this power arrangement it is possible to move an aggregate of 150 loaded cars through the tunnel at a very slow speed by driving the pump 90 with a one horse power motor 101.

From the foregoing description of my invention, it will be seen that when using my mechanism it is possible to express an unusually large number of lightly constructed trucks loaded with green ceramic ware through a drier or burning tunnel in a uniform and certain manner by engaging the cars or trucks in the tunnel with a reciprocating hydraulically operated draw bar extending throughout the length of the tunnel and that such mechanism necessitates only the use of a minimum amount of power while insuring long service from light weight trucks. Furthermore, the operation of the mechanism is entirely automatic in its reciprocatory movement and individual engagement thereof with each truck in the kiln.

I claim:—

1. In a drying kiln of the car tunnel type, the combination of a reciprocating draw bar extending substantially the length of the tunnel, a plurality of automatically acting members mounted on the draw bar for separately attaching each car of a train of cars in the tunnel to the draw bar when the draw bar is moving in one direction, and actuating means for the draw bar for actuating the draw bar at a greater speed in one direction than in the other of its reciprocatory motion.

2. In a drying kiln of the car tunnel type, the combination of a reciprocating draw bar extending substantially the length of the tunnel, and a plurality of equidistantly spaced apart automatically acting members on the draw bar for separately attaching each car of a train of cars in the tunnel to the draw bar when the draw bar is moving in one direction, and means for actuating the draw bar in said last named direction at a space which is less than when moving in the opposite direction.

3. In combination, a car tunnel kiln, a track in the kiln, a plurality of cars traversing the trackway, and a continuously operated reciprocating means extending beneath the cars and between the rails of said trackway for engaging each of said cars individually to move them and means for actuating the reciprocating means at different speeds in opposite directions.

4. In combination, a car tunnel kiln, a track in the kiln, a plurality of cars traversing the trackway, and a reciprocating draw bar mechanism extending beneath the axles of the cars and between the rails of said trackway for engaging each of said cars on the axles thereof to move them and means for actuating the draw bar mechanism at different speeds in opposite directions.

5. In combination, a car tunnel kiln, a track in the kiln, a plurality of cars traversing the trackway, and a reciprocating draw bar mechanism extending beneath the cars and between the rails of said trackway and carrying a plurality of automatically operable means for engaging each of said cars on the axles thereof to move them and means for actuating the draw bar mechanism in opposite directions at different speeds.

6. The combination of a track and a tunnel kiln extending longitudinally thereof, a plurality of ware-carrying cars on said track and a continuously operated reciprocating means disposed beneath the cars and between the track rails for engaging the axles of each of said cars and for thereafter moving the cars in unison and means for actuating the reciprocating means in opposite directions at different speeds.

7. An apparatus for moving a train of cars through a tunnel drying kiln comprising a draw bar mechanism extending throughout the length of the tunnel for individually engaging each one of a train of cars to move them in spaced apart relation, and hydraulically operated means for actuating said mechanism, at relatively different speeds in its reversing movements.

8. In an apparatus of the character described, the combination of a draw bar for engaging a plurality of cars in a drier kiln tunnel independently, and means disposed throughout the length of the tunnel for supporting the draw bar comprising anti-friction bearings for said draw bar and hydraulically operated means for reciprocating the draw bar.

9. An apparatus having in combination draw bar mechanism extending throughout the length of a car tunnel kiln, the draw bar being adapted to engage the cars of the train whereby the train may be moved with the cars in a spaced apart relation, means for actuating the draw bar in a reciprocatory movement including a pair of hydraulic rams of unequal diameter, a fluid pressure pump and interconnecting lines between the rams and pump and a reversing valve actuated by said means for controlling the flow of fluid in said lines whereby the pump may alternately force fluid to the ram cylinders.

10. An apparatus having in combination a draw bar mechanism extending throughout the length of a car tunnel kiln, the draw bar being adapted to engage the cars of the train whereby the train may be moved with the cars in spaced apart relation, means for actuating the draw bar in a reciprocatory movement including a pair of hydraulic rams of unequal diameter, a shaft extending transversely of the draw bar and operatively connected thereto, and a reversing valve actuated by said shaft for controlling the flow of fluid in a pump line whereby the pump may alternately force fluid to the ram cylinders.

11. An apparatus having in combination, a draw bar mechanism extending throughout the length of a car tunnel kiln, the draw bar carrying a plurality of means adapted to engage the cars of the train whereby the train may be moved when the draw bar is moving in one direction, means for actuating the draw bar in a reciprocatory movement including a pair of hydraulic rams, a fluid pressure pump and interconnecting lines for actuating the rams, a shaft reversibly operated by the rams and in turn actuating the draw bar, and a reversing valve actuated by said shaft for controlling the flow of fluid in said lines whereby the reciprocating movement of the draw bar may be controlled.

12. In a drier kiln of the car tunnel type, the combination of a plurality of cars in the tunnel, a car actuating mechanism extending throughout the length of the tunnel including a plurality of means for engaging each car independently of the other when said mechanism is moved in one direction, means for actuating said mechanism at an increased speed in an opposite direction, including hydraulically operated rams, and means for automatically controlling the operation of the rams whereby actuation is arrested when said mechanism has been actuated a distance corresponding to the length of the car plus an over travel.

13. In a drier kiln of the car tunnel type, the combination of a plurality of cars in the tunnel, a car actuating mechanism extending throughout the length of the tunnel, comprising means for engaging each car independently of the other, means for moving said mechanism at an increased speed in an opposite direction to the car movement, and means for automatically controlling the operation of said mechanism whereby actuation of the mechanism is arrested when the cars have been actuated a distance corresponding to the length of the car plus an overtravel.

14. In a drier kiln of the car tunnel type, the combination of a plurality of cars in the tunnel, a draw bar mechanism extending throughout the length of the tunnel, a plurality of dog levers for engaging each car independently of the other when the draw bar is moved in one direction, hydraulically operated means for moving the draw bar at an increased speed in an opposite direction, and means for automatically controlling the operation of the hydraulically operated means whereby when the draw bar has been actuated a distance corresponding to the length of the car plus an overtravel its direction of movement is reversed.

15. In a drier kiln of the character described, a mechanism extending throughout the length of the kiln and carrying a plurality of means for engaging individually each car of a train of cars therein, a shaft extending transversely of the tunnel, a sheave on the shaft, a cable wound about the sheave and attached to the draw bar whereby when the direction of rotation of the shaft is reversed, the direction of movement of the draw bar may be reversed and a pair of hydraulic rams alternately operative to drive said shaft in both directions through a predetermined movement corresponding to the movement of the draw bar.

16. In a drier kiln of the character described, a draw bar extending throughout the length of the kiln and carrying a plurality of means for engaging individually each car of a train of cars therein, a shaft extending transversely of the tunnel, a sheave on the shaft, a cable wound about the sheave and attached to the draw bar whereby when the direction of rotation of the shaft is reversed, the direction of movement of the draw bar may be reversed, a pair of hydraulic rams alternately operative to drive said shaft in both directions through a predetermined movement corresponding to the movement of the draw bar, a pump for operating the rams and a valve mechanism operated by movement of said shaft whereby the pump alternately acts upon the rams.

17. In a drier kiln of the character described, a draw bar extending throughout the length of the kiln and carrying a plurality of means for engaging individually each car of a train of cars therein, a shaft extending transversely of the tunnel, a sheave on the shaft, a cable wound about the sheave and attached to the draw bar whereby when the direction of rotation of the sheave is reversed, the direction of movement of the draw bar may be reversed, a pair of hydraulic rams alternately operative to drive said shaft, sheaves carried by the rams, a second sheave on the shaft, and a cable extending over the ram sheaves and said second sheave.

18. In an apparatus of the character described, the combination of a draw bar adapted to engage a plurality of cars, a pair of hydraulically operated rams for actuating the draw bar in a reciprocating movement at different speeds, and means for synchronizing the movement of the rams when either one of them is carrying the load.

In testimony whereof, I hereunto affix my signature.

GEORGE W. DENISON.